(12) United States Patent
Beltman et al.

(10) Patent No.: US 8,725,506 B2
(45) Date of Patent: May 13, 2014

(54) SPEECH AUDIO PROCESSING

(75) Inventors: Willem M. Beltman, West Linn, OR (US); Matias Zanartu, Layfayette, IN (US); Arijit Raychowdhury, Hillsboro, OR (US); Anand P. Rangarajan, Beaverton, OR (US); Michael E. Deisher, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 12/828,195

(22) Filed: Jun. 30, 2010

(65) Prior Publication Data

US 2012/0004909 A1 Jan. 5, 2012

(51) Int. Cl.
*G10L 15/00* (2013.01)
*G10L 21/00* (2013.01)
*H04B 1/10* (2006.01)

(52) U.S. Cl.
USPC ............................ 704/233; 704/208; 455/307

(58) Field of Classification Search
USPC .................. 704/233, 208, E19.047, E21.002, 704/E17.003; 455/307
See application file for complete search history.

(56) References Cited

U.S. PATENT DOCUMENTS

| | | | | |
|---|---|---|---|---|
| 5,148,488 A * | 9/1992 | Chen et al. | ...................... | 704/219 |
| 5,570,453 A * | 10/1996 | Gerson et al. | ................. | 704/219 |
| 5,774,846 A * | 6/1998 | Morii | .............................. | 704/232 |
| 5,864,810 A * | 1/1999 | Digalakis et al. | ............. | 704/255 |
| 5,915,234 A * | 6/1999 | Itoh | ................................ | 704/219 |
| 5,970,446 A * | 10/1999 | Goldberg et al. | ............. | 704/233 |
| 6,205,421 B1 * | 3/2001 | Morii | ............................. | 704/226 |
| 6,408,269 B1 * | 6/2002 | Wu et al. | ....................... | 704/228 |
| 6,427,134 B1 * | 7/2002 | Garner et al. | .................. | 704/233 |
| 6,757,651 B2 * | 6/2004 | Vergin | .......................... | 704/233 |
| 7,072,833 B2 * | 7/2006 | Rajan | ............................ | 704/233 |
| 7,082,393 B2 * | 7/2006 | Lahr | .............................. | 704/233 |
| 7,117,157 B1 * | 10/2006 | Taylor et al. | .................. | 704/270 |
| 7,457,750 B2 * | 11/2008 | Rose et al. | .................... | 704/244 |
| 8,121,837 B2 * | 2/2012 | Agapi et al. | .................. | 704/233 |
| 2002/0026253 A1 | 2/2002 | Rajan | | |
| 2002/0055913 A1 | 5/2002 | Rajan | | |
| 2002/0120443 A1 * | 8/2002 | Epstein et al. | ................ | 704/233 |
| 2003/0177007 A1 * | 9/2003 | Kanazawa et al. | ............ | 704/233 |
| 2004/0064315 A1 * | 4/2004 | Deisher et al. | ................ | 704/233 |
| 2004/0083100 A1 * | 4/2004 | Burnett et al. | ................ | 704/233 |
| 2004/0193411 A1 * | 9/2004 | Hui et al. | ....................... | 704/233 |
| 2008/0288258 A1 | 11/2008 | Jiang et al. | | |

(Continued)

FOREIGN PATENT DOCUMENTS

| | | |
|---|---|---|
| JP | 2002006898 A | 1/2002 |
| KR | 10-2005-0106235 | 11/2005 |

(Continued)

OTHER PUBLICATIONS

Thomas F. Quatieri, Discrete-time Speech Signal Processing Principle and Practice, Prentice Hall Signal Processing Series, 2002; pp. 59, 64, 225-226, 150.*

(Continued)

*Primary Examiner* — David R Hudspeth
*Assistant Examiner* — Timothy Nguyen
(74) *Attorney, Agent, or Firm* — Jordan IP Law, LLC

(57) ABSTRACT

A speech processing engine is provided that in some embodiments, employs Kalman filtering with a particular speaker's glottal information to clean up an audio speech signal for more efficient automatic speech recognition.

16 Claims, 3 Drawing Sheets

(56) References Cited

U.S. PATENT DOCUMENTS

| | | | |
|---|---|---|---|
| 2009/0076814 A1* | 3/2009 | Lee | 704/233 |
| 2009/0163168 A1* | 6/2009 | Andersen et al. | 455/307 |
| 2009/0222263 A1* | 9/2009 | Collotta et al. | 704/233 |
| 2010/0131269 A1* | 5/2010 | Park et al. | 704/233 |
| 2010/0262425 A1* | 10/2010 | Tanabe et al. | 704/233 |
| 2011/0054892 A1* | 3/2011 | Jung et al. | 704/233 |
| 2011/0077939 A1* | 3/2011 | Jung et al. | 704/226 |
| 2011/0125490 A1* | 5/2011 | Furuta et al. | 704/205 |
| 2011/0305345 A1* | 12/2011 | Bouchard et al. | 381/23.1 |
| 2012/0179462 A1* | 7/2012 | Klein | 704/226 |

FOREIGN PATENT DOCUMENTS

| | | |
|---|---|---|
| TW | 309675 B | 7/1997 |
| TW | 425542 B | 3/2001 |
| WO | 2009/116291 A1 | 9/2009 |
| WO | 2012/003269 A2 | 1/2012 |
| WO | 2012/003269 A3 | 3/2012 |

OTHER PUBLICATIONS

International Search Report and Written Opinon received for PCT application No. PCT/US2011/042515, mailed on Feb. 9, 2012, 8 Pages.

International Preliminary Report on Patentability received for PCT application No. PCT/US2011/042515, mailed on Jan. 17, 2013, 5 pages.

Office Action for Taiwanese Patent Application 100123111, mailed on Sep. 26, 2013. 11 pages including 7 pages of English language translation.

Office Action Received for Japanese Patent Application No. 2013-513424, mailed on Dec. 10, 2013, 4 pages of Office Action including 2 pages of English Translation.

Notice of Preliminary Rejection for Korean Patent Application No. 10-2012-7031843 received Feb. 7, 2014, 7 pages including 3 pages of English translation.

* cited by examiner

SPEECH AUDIO PROCESSING

TECHNICAL FIELD

The present invention relates generally to audio processing and in particular, to speech signal processing.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Voice command and continuous speech recognition are used for mobile Internet devices, for example, with in-car applications and phones that have limited keyboard functionality. It is desirable to be able to provide clean input to any speech recognition engine, but background noise in the environment impedes this objective. For example, experiments have shown that the open dictation word accuracy can degrade to approximately 20% in car noise and cafeteria environments, which may be unacceptable to the user.

Today's speech engines have some noise reduction features to reduce the impact of background noise. However, these features may not be sufficient to allow open dictation in challenging environments. Accordingly, Kalman filtering techniques may be used to improve speech signal processing.

With some embodiments presented herein, speech recognition performance may be enhanced by bifurcating audio noise filtering processing into separate speech recognition and human reception paths. That is, the audio path may be cloned to generate a "perception" (or auditory reception) channel and a separate channel that is used for preprocessing audio for the speech recognition engine.

Figure 1:
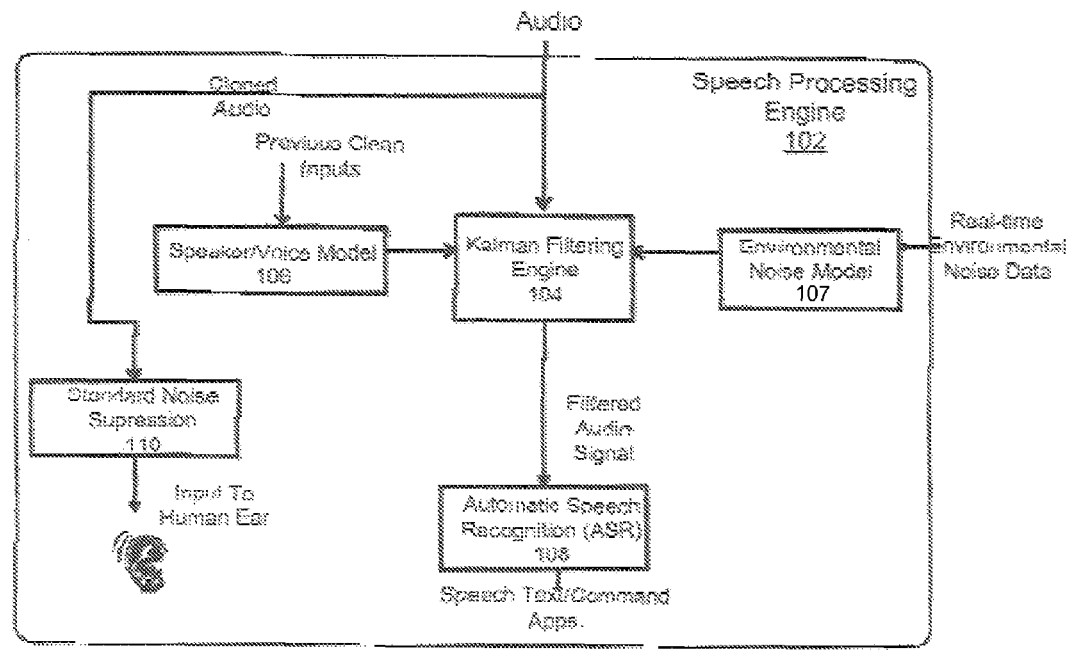
FIG. 1 is a diagram for a speech processing engine in accordance with some embodiments.

FIG. 1 is a block diagram of a speech processing engine 102 in accordance with some embodiments. It comprises a Kalman based filtering engine 104, a speaker/voice model 106, an environmental noise model 107, an automatic speech recognition (ASR) engine 108, and a standard noise suppression block 110.

Audio (e.g., digitized audio from a microphone) comes into the SPE (speech processing engine) and is split into two paths: a speech recognition path, entering the Kalman filter block 104, and an audio perception path (cloned audio) that is processed using standard noise suppression techniques in block 110 for reception by a user. The Kalman filter utilizes components from the speaker/voice model 106, as well as from the environmental noise model 107, to filter out noise from the audio signal and provide a filtered signal to the automatic speech recognition (ASR) engine 108.

The speaker/noise model 106 (at least an initial version) is generated before SPE execution since the SPE works off of it, although an initial version may be fairly bare, and the speech/voice model may be updated while the SPE is executing. The speaker/voice engine 106 provides particular characteristics associated with the current speaker. Such characteristics could include one or more glottal harmonics, including the user's particular fundamental glottal frequency, along with any other suitable information. For example, if previously acquired models (e.g., resulting from user training) are available, they may also be incorporated into the speaker/user model 106. As indicated, previously generated "clean" audio information (x'(n)) for the particular user may also be used.

The environmental noise model 107, like the speaker/voice model, may be based on initial default data/assumptions for assumed noise environments or for specific or previously characterized environments (e.g., an office, a car, an airplane, etc). It may be static data (e.g., assumed background noise elements) associated with an environment and/or it may comprise dynamic data obtained from real-time sensors and the like. For example, it could include sensor inputs such as car speed, background noise microphone data, and air conditioning information, to enhance the performance of the noise model estimator. In some embodiments, a noise estimation method may be employed, e.g., for a single channel, by detecting periods of speech absence using a voice activity detector algorithm. The noise model may be further enhanced using an iterative loop between the noise model and Kalman filtering.

The filter 104 may use either or both the speaker model and noise model to filter the received audio signal. Again, from the speaker model, it may use an extension to add periodic components in the form of pulses into the Kalman filtering to account for glottal harmonics generated by the speech source (e.g., human or other entity speaker using, for example, a dictation, voice controlled, or translation device). Kalman filtering has typically been used with a white noise input, but in the case of human speech, the addition of a periodic input may more closely resemble the physiology of speech generation. The speaker model information including the predetermined model information and glottal harmonic parameters may be used to load a set of predetermined or previously determined coefficients for the speaker model. Kalman filtering results in audio that does not necessarily noticeably improve the human perception, but it does typically improve the performance of the speech recognition engine. Therefore, the audio path is cloned (two paths) to maximize both human perception and the speech recognition input using the Kalman pre processing filtering.

An implemented filter 104 using Kalman techniques can be used to model the vocal tract response as an AR or ARMA system, using an independent input and a driving noise, along with a noisy observation that accounts for additive colored-noise.

In conventional Kalman applications, the driving periodic input is typically neglected and only a driving white noise is used for simplicity. This assumption implies that the filter will (under an ideal performance) produce a clean but unvoiced speech signal, which neither has physiological value nor sounds natural. However, the assumption may be adequate in cases where only filter parameters are needed.

On the other hand, we have determined that the linear Kalman filter may capture the fundamental interactive features observed in voice production, thus yielding better estimates of the clean input under noisy conditions. When combined with CP analysis and source modeling, for example, it may perform even better for speech processing applications. The error in a scheme of this nature will be associated to its parameter estimation errors and not the product of a physiological/acoustical misrepresentation. Therefore, speech enhancement schemes disclosed herein are based on the linear Kalman filter, with the structure shown in the following table under the "Linear" heading.

| (a) Nonlinear | (b) Linear |
|---|---|
| $x_{k+1} = f(x_k, u_k, w_k)$ | $x_{k+1} = \Phi x_k + B u_k + w_k$ |
| $y_k = h(x_k, v_k)$ | $y_k = H_k x_k + v_k$ |

The state $x_k$ corresponds to the clean speech input that is produced by the glottal source $u_k$ and environmental noise $w_k$. (x, is not an actual input to the SPE.) The measured signal $y_k$ is corrupted by the observation noise $v_k$. As described before, previous Kalman approaches neglect the periodic input $u_k$ for simplicity, yielding white noise excited speech. However, the inclusion of such a periodic input and CP representation of the state transition matrix provides better estimates of the clean input $x_k$ and thus better speech recognition performance. In the following section, Kalman filtering, as applied herein, will be discussed in more detail.

In some embodiments, a Kalman filtering model-based approach is used for speech enhancement. It assumes that the clean speech follows a particular representation that is linearly corrupted with background noise. With standard Kalman filtering, clean speech is typically represented using an autoregressive (AR) model, which normally has a white Gaussian noise as an input. This is represented in discrete time equation 1.

$$x[n] = \sum_{k=1}^{p} \alpha_n x[n-k] + w[n] \quad (1)$$

where x[n] is the clean speech, $\alpha_n$ the AR or linear prediction coding (LPC) coefficients, w[n] the white noise input, and p is the order of the AR model (normally assumed to follow the rule of thumb p=fs/1000+2, where fs is the sampling rate in kHz). This model can be rewritten to produce the desired structure needed for the Kalman filter, as described in equations (2) and (3). Thus, $$x_{k+1} = \Phi x_k + G w_k \quad (2)$$

$$y_k = H x_k + v_k \quad (3)$$

where $x_{k+1}$ and $x_k$ are vectors containing p samples of the future and current clean speech, $\Phi$ is the state transition matrix that contains the LPC coefficients in the last row of a controllable canonical form, $w_k$ represents the white noise input that is converted into a vector that affects the current sample via the vector gain G. The clean speech is projected via the projector vector H to obtain the current sample that is linearly added to the background noise $v_k$ to produce the corrupted observation or noisy speech $y_k$.

Kalman filtering comprises two basic steps, a propagation step and an update step. In the propagation step the model is used to predict the current sample based on the previous estimate (hence the notation n|n−1). This is represented in equation (4). Note that only one buffer of one vector containing the previous p points is required. The update step is depicted in equations (5)-(7), where the predicted samples are first corrected considering the error between the prediction and the estimate. This error is controlled by the Kalman gain $K_n$, which is defined in equations (6) and (7). Note that all these parameters may be computed once within each frame, i.e., speech is considered a stationary process within each frame (normally of duration no longer than 25 ms).

$$\hat{x}_{n|n-1} = \Phi \hat{x}_{n-1|n-1} \quad (4)$$

$$\hat{x}_{n|n} = \hat{x}_{n|n-1} + K_n(y_n - H_n \hat{x}_{n|n-1}) \quad (5)$$

$$K_n = P_{n|n-1} H_n^T (H_n P_{n|n-1} H_n^T + R_n)^{-1} \quad (6)$$

$$P_{n|n} = I - (K_n H_n) P_{n|n-1} \quad (7)$$

The "modified Kalman filter" that is proposed in this project extends the standard filter by generalizing the two basic noise assumptions in the system, i.e., assuming that glottal pulses also drive the AR model during voiced segments and that the background noise has resonances associated with it (non-white process). The glottal pulses are represented by u[n] and are present when there is vocal fold vibration. The background noise is assumed to follow an AR model of order q (which may be estimated, e.g., empirically obtained as q=fs/2000). Therefore, the two equations that represent the new structure of the system are $$x[n] = \sum_{k=1}^{p} \alpha_n x[n-k] + u[n] + w_s[n] \quad (8)$$

$$v[n] = \sum_{k=1}^{q} \beta_n v[n-k] + w_n[n] \quad (9)$$

Since the model for speech and noise have a similar structure, the state equation needed to the Kalman filter can be extended by creating two subsystems embedded in a larger diagonal matrix. The same system structure is used to track speech and noise as shown in equations (10) to (13), where the subscript s indicates speech and v indicates background noise. The glottal pulses are introduced only in the current sample, for which the vector B has the same structure as G.

$$x_{k+1} = \Phi x_k + B u_k + G w_k \quad (10)$$

$$y_k = H x_k + v_k \quad (11)$$

$$\Phi = \begin{bmatrix} \phi_s & 0 \\ 0 & \phi_v \end{bmatrix} \quad (12)$$

$$H = [H_s \ H_v] \quad (13)$$

The equations to compute Kalman propagation and update are different from the standard Kalman filter, for among other reasons, in that the glottal pulses are included and the noise covariance matrix $R_n$ is not, since the noise is being tracked by the filter itself. These changes are represented by modifying equation (4) by (14), and equation (6) by (15). Thus, $$\hat{x}_{n|n-1} = \Phi \hat{x}_{n-1|n-1} + B u_k \quad (14)$$

$$K_n = P_{n|n-1} H_n^T (H_n P_{n|n-1} H_n^T)^{-1} \quad (15)$$

With these modifications, the filter better represents speech signal and background noise conditions, thus yielding better noise removal and ASR performance.

Figure 2:
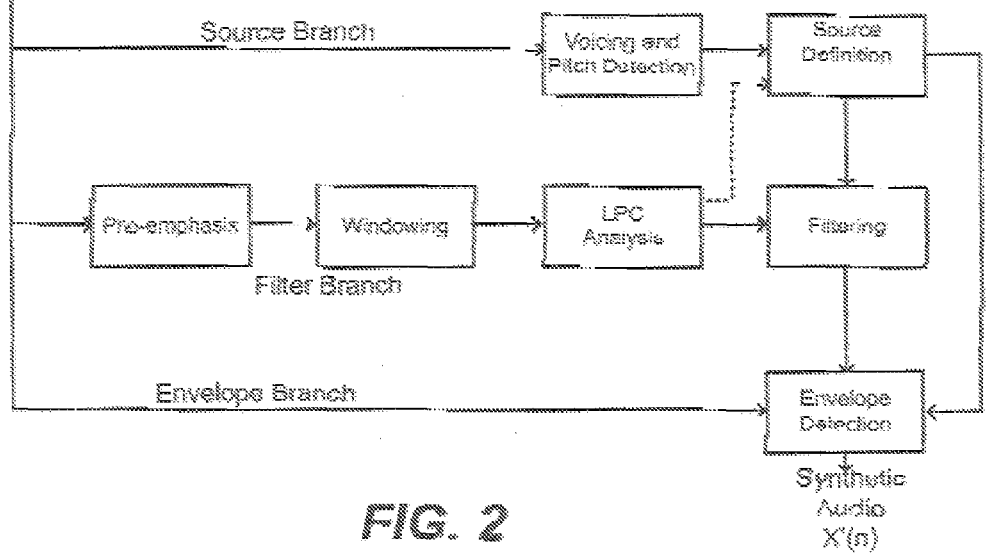
FIG. 2 is a diagram of a synthesizer in accordance with some embodiments.

The new Kalman filtering technique can not only be used for enhancement of speech recognition, but also to improve speech synthesis. With reference to FIG. 2, a diagram showing a time-domain based synthesizer is shown. The proposed scheme has a design that combines three interconnected processes that are applied to the input signal. The first branch identifies the nature of the source component and creates a source signal. The second branch searches for the filter structure and applies either CP-(closed phase) analysis or full-frame analysis to define the Linear Prediction Coefficients (LPC) of the filter. The third branch detects the envelope and ensures stability of the synthetic sound. These branches can be computed in a sequential or parallel fashion and may use different frame and windowing structures (e.g., in some implementations, the first branch could use a rectangular window and non-overlapping frames, while the second one could use Hamming with, for example, 50% of overlap) as long the level of interaction is handled properly.

Figure 3:
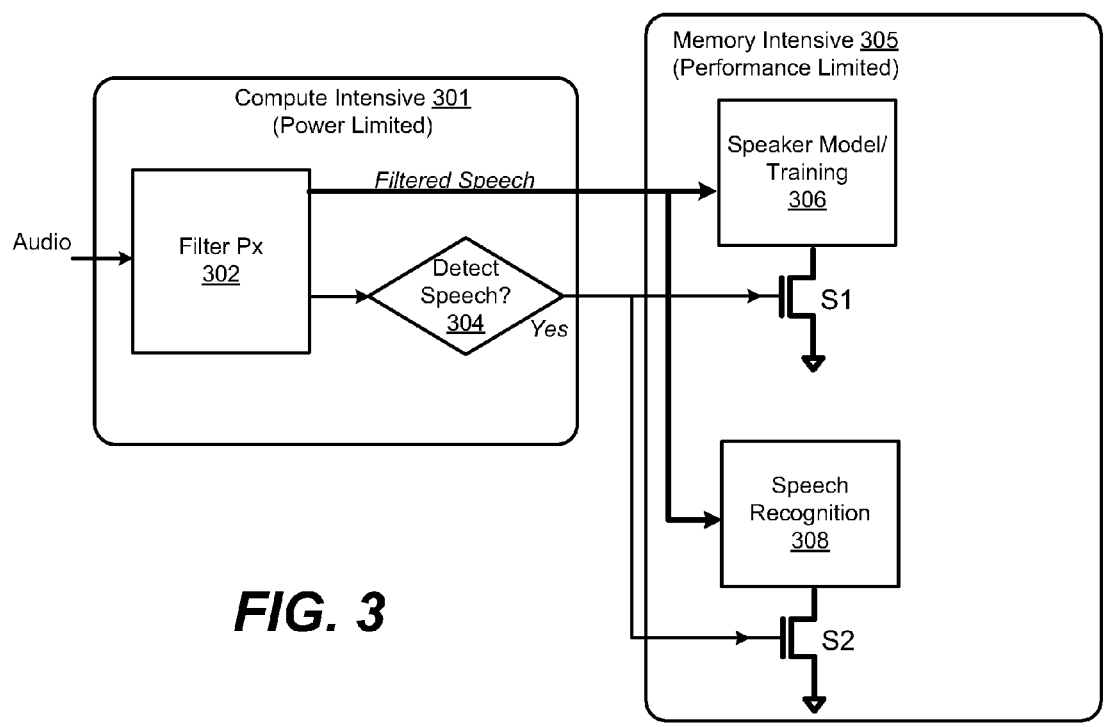
FIG. 3 is a diagram of a structure for implementing a speech processing engine in accordance with some embodiments.

FIG. 3 shows a general structure for implementing a front-end for an audio processing engine, e.g., in a mobile device, for reducing power consumption. It illustrates a power efficient way to structure the different blocks, e.g., for the SPE 102 of FIG. 1. It is divided into a compute intensive block 301 and a backend 305, which is memory access intensive. The compute intensive front end 301 has a filter processing section 302 and a decision block 304 for determining if input audio has speech within it. The memory intensive back end 305 has speaker model block 306 for generating and updating the speaker model and a speech recognition block 308 for implementing ASR. Note that the speaker model block 306 may also have a noise model section for generating all or part of the noise model. Audio comes into the front end 301, processed by filter 302 and if it has speech, as decided at decision block 304, the speaker model and speech recognition blocks 306, 308 are activated for processing the filtered speech signal from the filter 302.

By reducing memory requirements at the front-end of the hardware, the use of lower power operation may be enabled to increase the number of operations per watt. The hardware implementation of the speech enhancement algorithms in the front-end 301 provides opportunity for achieving low power and will also enables the use of a threshold detector 304 to provide a wake-up signal to the back-end of the processor hardware. The back end 305 provides hardware implementation of the speech recognition algorithms e.g., (HMM and/or neural networks based), which is typically memory intensive, and high performance. Thus by dividing the hardware (e.g., SPE hardware) into a compute-intensive front-end and a high performance back-end, "voice-wake" and "always-listening" features may also be implemented for speech enhancement and recognition.

Figure 4:
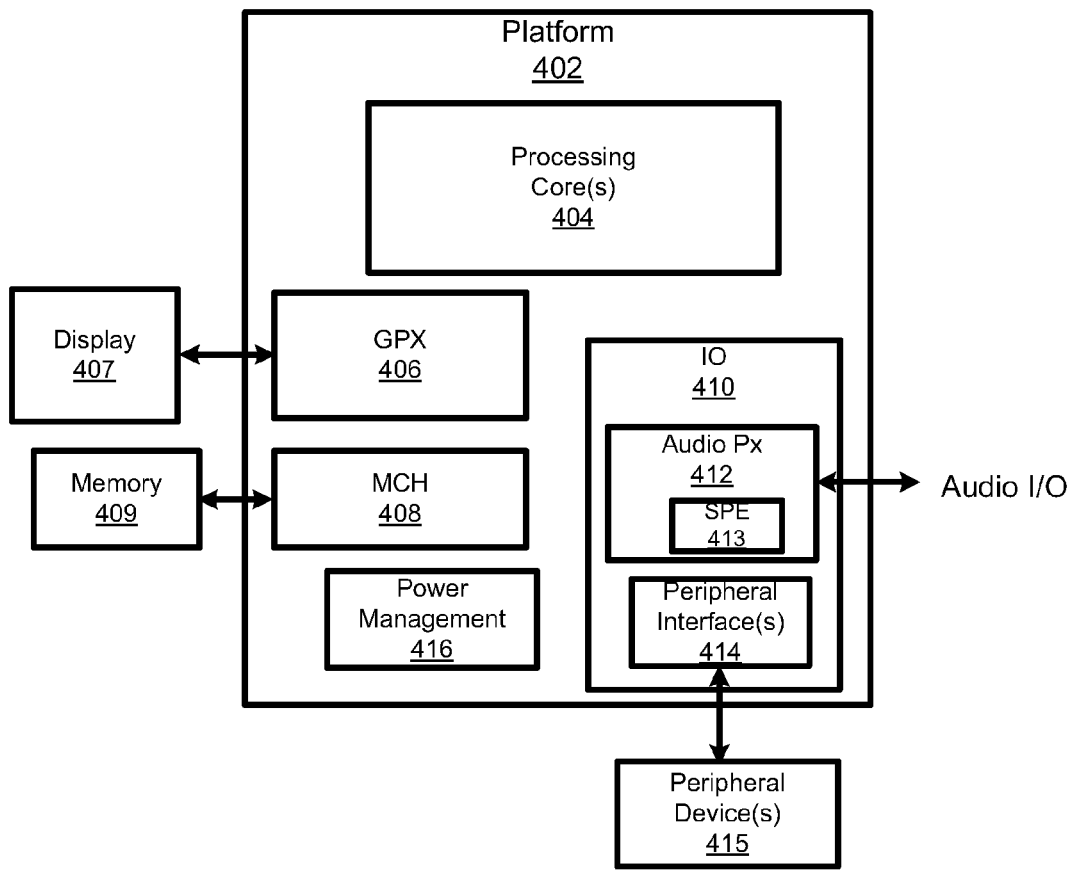
FIG. 4 is a diagram of an electronic device platform in accordance with some embodiments.

FIG. 4 shows an example of an electronic device platform 402 such as for a portable computing device, smart phone, and the like. The represented portion comprises one or more processing cores 404, graphics processor (GPX) 406, memory controller hub (MCH) 408, IO section 410, and power management section 416. The GPX 406 interfaces with a display 407 to provide video content. The MCH 408 interfaces with memory 409 for providing the platform with additional memory (e.g., volatile or non-volatile). The power management section 416 controls a power source (e.g., battery, adapter converters, VRs, etc.) to provide power to the different platform sections, and it also manages the different activity states for reducing power consumption when feasible.

The IO section 410 comprises an audio processing section 412 and peripheral interfaces(s) 414. The Peripheral interface(s) provide interfaces (e.g., PCI, USB) for communicating and enabling various different peripheral devices 415 (keyboard, wireless interface, printer, etc.). The audio processing section 412 may receive various audio input/output (analog and/or digital) for providing/receiving audio content from a user. It may also communicate with internal modules, for example, to communicate audio between a user and a network (e.g., cell, Internet, etc.). The audio processing section 412 includes the various components (e.g., A/D/A converters, codecs, etc. for processing audio as dictated by the functions of the platform 402. In particular, the audio Px 412 includes an SPE 413, as discussed herein, for implementing speech processing. In particular, it may comprise a power efficient structure as described in FIG. 3.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
   a speech processing engine having first and second forwardly independent audio speech paths, the first path being an audio perception path to be processed using a noise suppression technique and to be provided to an auditory receiver for reception by a user; and
   a Kalman filter coupled to the second path to receive an audio speech signal and to remove noise therefrom, the Kalman filter to remove said noise based at least in part on a speaker model input including speaker glottal information, in which the speaker model incorporates previously generated noise-removed speech signal information for the speaker;
   wherein the Kalman filter is to linearly add each of a specified glottal pulse variable and a specified environmental noise variable to a product of a current clean speech vector variable and a state transition matrix variable.

2. The apparatus of claim 1, in which the filter is to remove noise based also on a noise model input including environmental noise information.

3. The apparatus of claim 2, in which the environmental noise information includes real-time information.

4. The apparatus of claim 3, in which the real-time information includes information from one or more noise sensors.

5. The apparatus of claim 1, in which the filter is implemented in a front end section and the speaker model is implemented in a back end section that is enabled if speech is detected in the audio speech signal.

6. The apparatus of claim 5, in which the speech processing engine comprises a speech recognition engine.

7. The apparatus of claim 6, in which the speech recognition engine is part of the back end section.

8. An electronic device, comprising:
   an audio processing section including a speech processing engine having first and second forwardly independent audio speech paths, the first path being an audio perception path to be processed using a noise suppression technique and to be provided to an auditory receiver for reception by a user; and
   a Kalman filter coupled to the second path to receive an audio speech signal and to remove noise therefrom, the Kalman filter to remove said noise based at least in part on a speaker model input including speaker glottal information, in which the speaker model incorporates previously generated noise-removed speech signal information for the speaker;
   wherein the Kalman filter is to linearly add each of a specified glottal pulse variable and a specified environmental noise variable to a product of a current clean speech vector variable and a state transition matrix variable.

9. The electronic device of claim 8, in which the filter is to remove noise based also on a noise model input including environmental noise information.

10. The electronic device of claim 9, in which the environmental noise information includes real-time information.

11. The electronic device of claim 10, in which the real-time information includes information from one or more noise sensors.

12. The electronic device of claim 8, in which the filter is implemented in a front end section and the speaker model is implemented in a back end section that is enabled if speech is detected in the audio speech signal.

13. The electronic device of claim 12, in which the speech processing engine comprises a speech recognition engine.

14. The electronic device of claim 13, in which the speech recognition engine is part of the back end section.

15. The apparatus of claim 1, wherein the standard noise suppression technique is to maximize an audio perception independently of the Kalman filter.

16. The apparatus of claim 1, wherein the Kalman filter is to include a specified glottal pulse variable and a specified environmental noise variable.

* * * * *

UNITED STATES PATENT AND TRADEMARK OFFICE
CERTIFICATE OF CORRECTION

PATENT NO. : 8,725,506 B2
APPLICATION NO. : 12/828195
DATED : May 13, 2014
INVENTOR(S) : Willem M. Beltman et al.

It is certified that error appears in the above-identified patent and that said Letters Patent is hereby corrected as shown below:

On the title page, item (75), in column 1, in "Inventor", line 2-3, delete "Layfayette, IN (US)" and insert -- Lafayette, IN (US) --, therefor.

On title page 2, item (56), in column 2, under "Other Publications", line 1, delete "Opinon" and insert -- Opinion --, therefor.

Signed and Sealed this
Twelfth Day of August, 2014

Michelle K. Lee
*Deputy Director of the United States Patent and Trademark Office*